(12) United States Patent
Shinn

(10) Patent No.: US 10,053,884 B1
(45) Date of Patent: Aug. 21, 2018

(54) VEHICLE SERVICE SYSTEM AND METHODS

(71) Applicant: Pit Systems, LLC, Albuquerque, NM (US)

(72) Inventor: Albert Wayne Shinn, Concord, NC (US)

(73) Assignee: Pit Systems, LLC, Albuquerque, NM (US)

( * ) Notice: Subject to any disclaimer, the term of this patent is extended or adjusted under 35 U.S.C. 154(b) by 0 days.

(21) Appl. No.: 15/272,884

(22) Filed: Sep. 22, 2016

Related U.S. Application Data

(60) Provisional application No. 62/222,048, filed on Sep. 22, 2015.

(51) Int. Cl.
*E04H 5/06* (2006.01)
*E04B 1/00* (2006.01)
*B66F 7/00* (2006.01)
*B60S 5/00* (2006.01)
*F16N 31/00* (2006.01)

(52) U.S. Cl.
CPC .................. *E04H 5/06* (2013.01); *B60S 5/00* (2013.01); *B66F 7/00* (2013.01); *E04B 1/0007* (2013.01); *F16N 31/002* (2013.01)

(58) Field of Classification Search
CPC . E04H 5/06; B66F 11/04; F16N 31/02; E04B 1/0007
See application file for complete search history.

(56) References Cited

U.S. PATENT DOCUMENTS

| | | | | |
|---|---|---|---|---|
| 1,357,022 | A * | 10/1920 | Bahls | B60S 5/00 52/174 |
| 1,654,073 | A * | 12/1927 | Fagan | B60S 5/00 137/236.1 |
| 3,603,046 | A * | 9/1971 | Humphrey, Jr. | E04H 5/06 52/173.1 |
| 3,866,624 | A | 2/1975 | Peterson | |
| 4,114,660 | A * | 9/1978 | Arruda | B67C 11/04 141/339 |
| 4,188,985 | A * | 2/1980 | Osterman | E04H 5/06 137/234.6 |
| 4,284,173 | A * | 8/1981 | Patterson | E04H 5/06 137/234.6 |
| 4,789,047 | A * | 12/1988 | Knobloch | F16N 31/002 137/234.6 |
| 4,987,973 | A * | 1/1991 | Cody | F16N 31/002 184/1.5 |
| 4,997,003 | A * | 3/1991 | Brennan | F04F 10/02 137/147 |
| 5,381,839 | A * | 1/1995 | Dowd | B65B 3/30 141/237 |
| 5,701,706 | A | 12/1997 | Kreysler et al. | |
| 5,738,160 | A * | 4/1998 | Rice | E04H 5/06 160/201 |
| 6,088,976 | A * | 7/2000 | Roy | A47G 27/0287 52/177 |
| 6,189,272 | B1 | 2/2001 | Deiss et al. | |
| 6,367,586 | B1 * | 4/2002 | Tally | F16N 31/004 141/231 |

(Continued)

*Primary Examiner* — Paola Agudelo
(74) *Attorney, Agent, or Firm* — Justin R. Muehlmeyer; Jeffrey D. Myers; Peacock Law P.C.

(57) ABSTRACT

A vehicle service system allowing a person in a sitting position access to the underside of a vehicle, waste recovery systems, and storage compartments.

11 Claims, 4 Drawing Sheets

(56) References Cited

U.S. PATENT DOCUMENTS

| | | | | |
|---|---|---|---|---|
| 6,385,920 B1* | 5/2002 | Chandler | ................ | E04H 9/12 |
| | | | | 52/169.6 |
| 6,539,678 B1* | 4/2003 | Campbell | ................ | E04H 5/06 |
| | | | | 160/133 |
| 7,213,621 B1* | 5/2007 | Chang | ................ | F16N 31/00 |
| | | | | 141/297 |
| 8,646,226 B2 | 2/2014 | Barram | | |
| 9,464,757 B2* | 10/2016 | Allen | ................ | F16N 31/004 |
| 2007/0158969 A1* | 7/2007 | Walkingshaw | .......... | A61G 3/00 |
| | | | | 296/64 |

* cited by examiner

VEHICLE SERVICE SYSTEM AND METHODS

CROSS-REFERENCE TO RELATED APPLICATIONS

This application claims priority to and the benefit of the filing of U.S. Provisional Patent Application Ser. No. 62/222,048, entitled "Automotive Vehicle Servicing System", filed on Sep. 22, 2015, and the specification thereof is incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

© 2016 Pit Systems, LLC. A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Field of the Invention (Technical Field)

The present invention relates to vehicle service systems, methods of making vehicle service systems, and methods of servicing a vehicle.

Background Art

Note that the following discussion may refer to a number of references. Discussion of such references herein is given for more complete background of the principles and is not to be construed as an admission that such references are prior art for patentability determination purposes.

Traditionally, there are several types of systems that allow a person to service a vehicle from underneath it: (1) a basement system in which the person stands in a pit below the ground level of the vehicle; (2) a shallow pit system in which the person lays horizontally on a sled which can be on or below the ground level of the vehicle, and (3) a high-lift system in which the vehicle is lifted above the service person who is standing at ground level. These traditional systems are uncomfortable for the service person, cause high rates of technician turnover and inefficiency, and pose certain hassles and expenses.

For example, basement systems typically require hard-to-get permits, expensive excavation (including digging, equipment outfitting, maintenance and problem remediation), expensive equipment, equipment maintenance, and typically face problems with leaks, mold, mildew, flooding, and increased rates of technician turnover from the unpleasant, unhealthy subterranean environments. Shallow pit systems render the service person confined to working on their back, which is uncomfortable and often causes injury. In addition, shallow pit systems, traditionally constructed of fiberglass, break down after just a couple of years due to exposure to the wastes inherent to servicing the underside of a vehicle. High-lift systems are expensive due to the technology required to lift vehicles high enough to access them from underneath, are dangerous due to the risk of lift-system failure, and require regularly scheduled maintenance. Thus there is a present need for a better vehicle servicing system that provides a comfortable and safe position for a service person to access the underside of a vehicle that is cost effective and efficient.

BRIEF SUMMARY OF THE INVENTION

Embodiments of the present invention pertain to systems and methods of accessing the underside of a vehicle for servicing the vehicle that alleviate and/or solve the problems inherent to the traditional vehicle servicing systems described above. This is achieved by constructing a vehicle service system comprising a pit recessed within the ground such that a person may service the underside of a vehicle from a sitting position. Servicing a vehicle from a sitting position decreases the service person's weariness, increases the service person's efficiency, and eliminates the need for costly and hazardous basements or high-maintenance, risky high-lift systems. The present invention overcomes inefficiencies of the prior art by providing systems and objects described herein at preferred locations within the pit that maximize the service person's efficiency and comfort. While a preferred embodiment of the invention is directed to automotive service systems, the invention is also useful in service systems for other types of vehicles.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings in the attachment, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention.

DETAILED DESCRIPTION OF THE INVENTION

Figure 1:
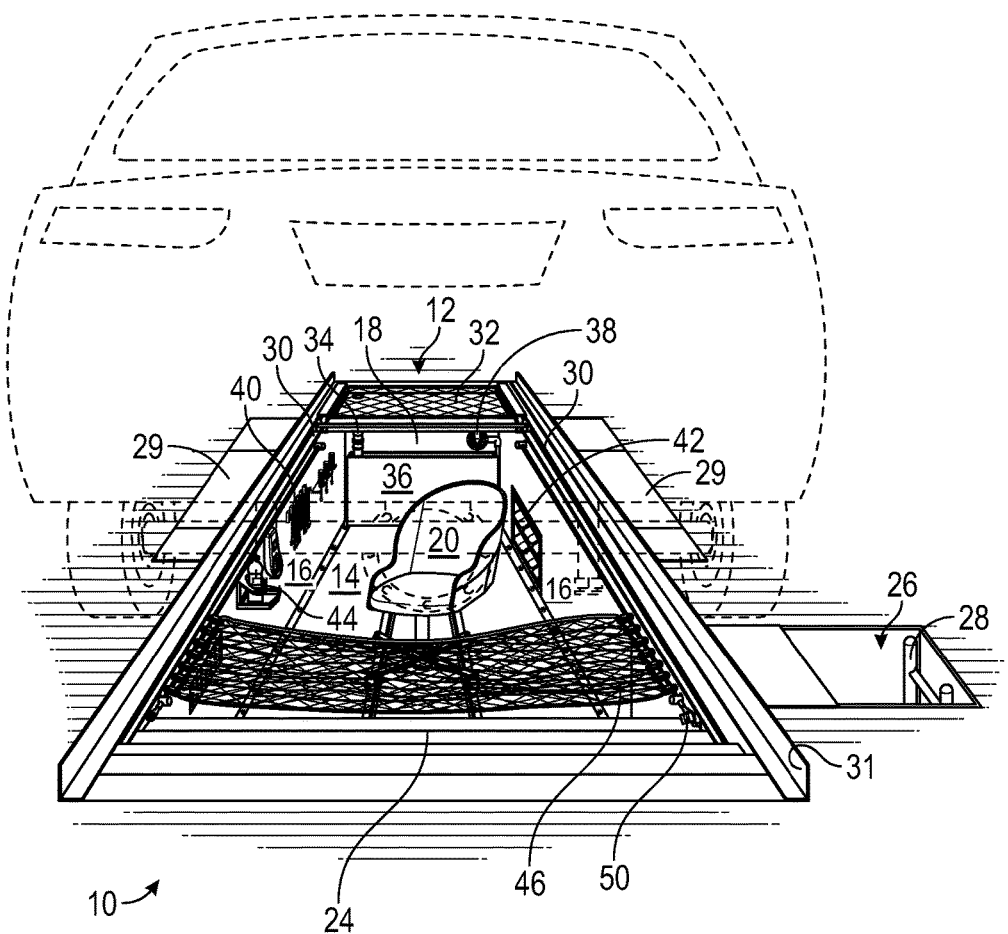
FIG. 1 is a perspective view of an embodiment of the vehicle service system of the present invention.
Figure 2:
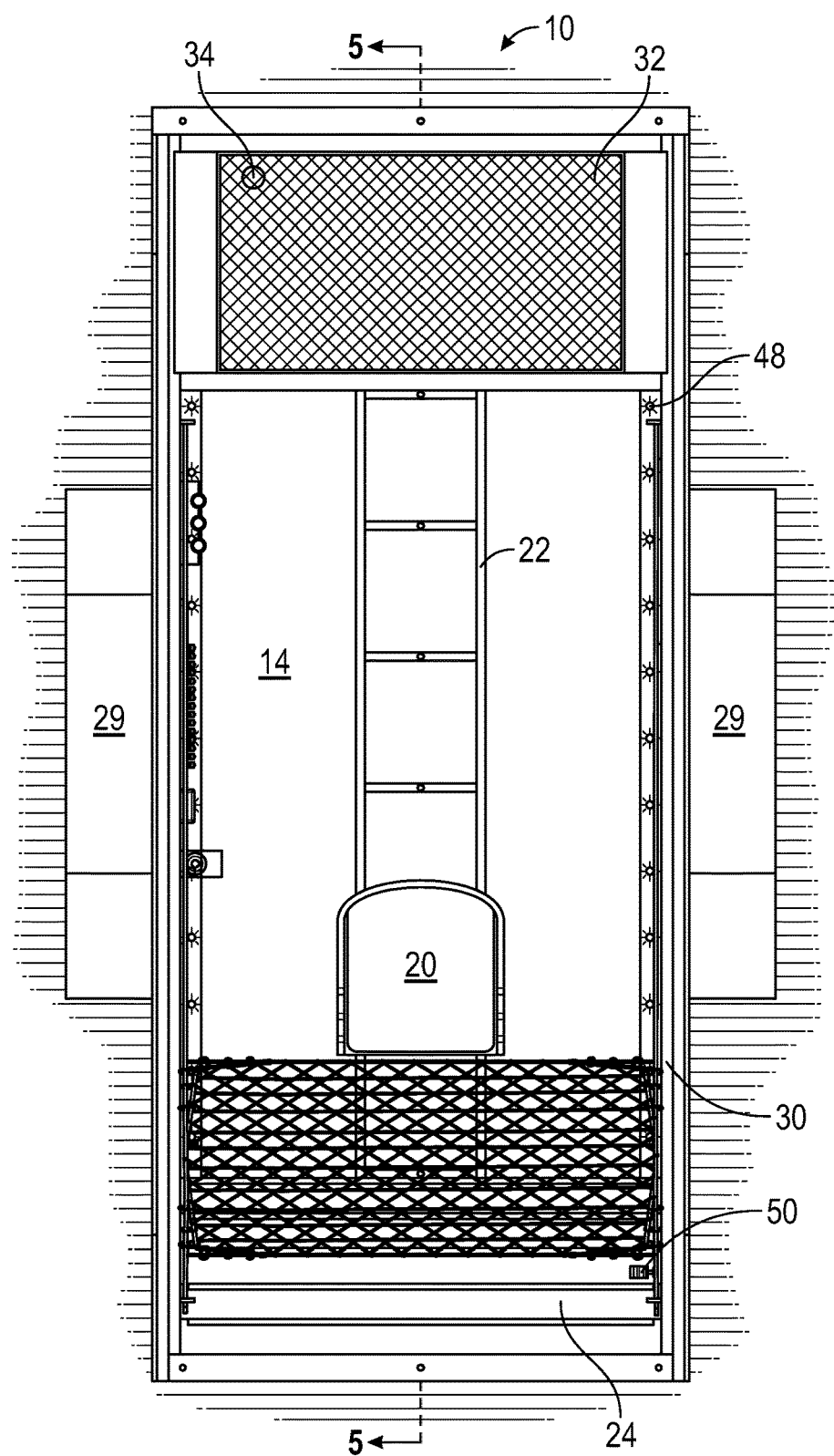
FIG. 2 is a top view of an embodiment of the vehicle service system of the present invention.
Figure 3:
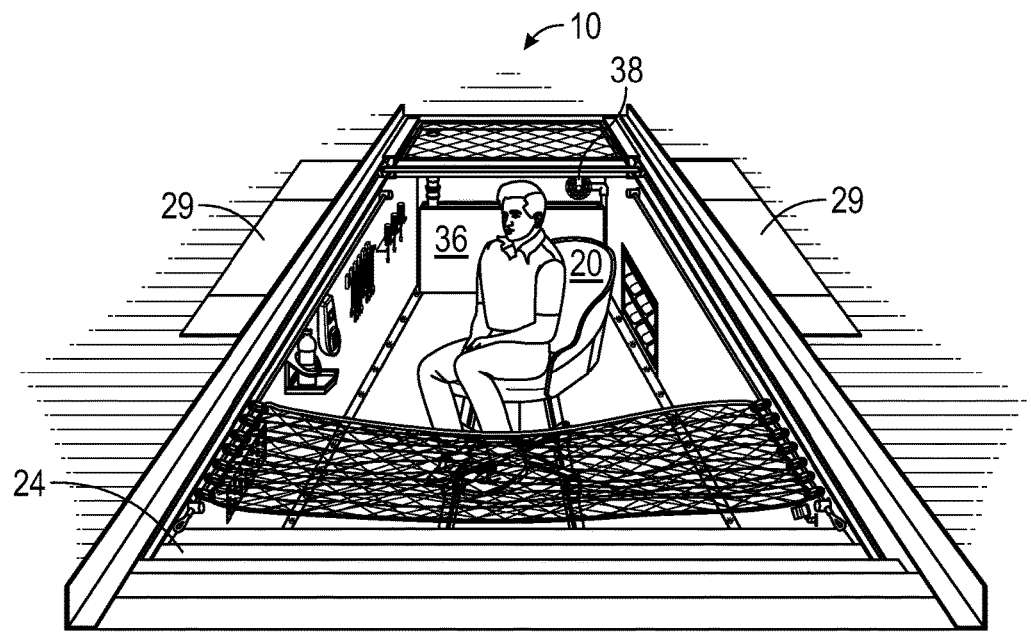
FIG. 3 is a perspective view of an embodiment of the vehicle service system of the present invention.
Figure 4:
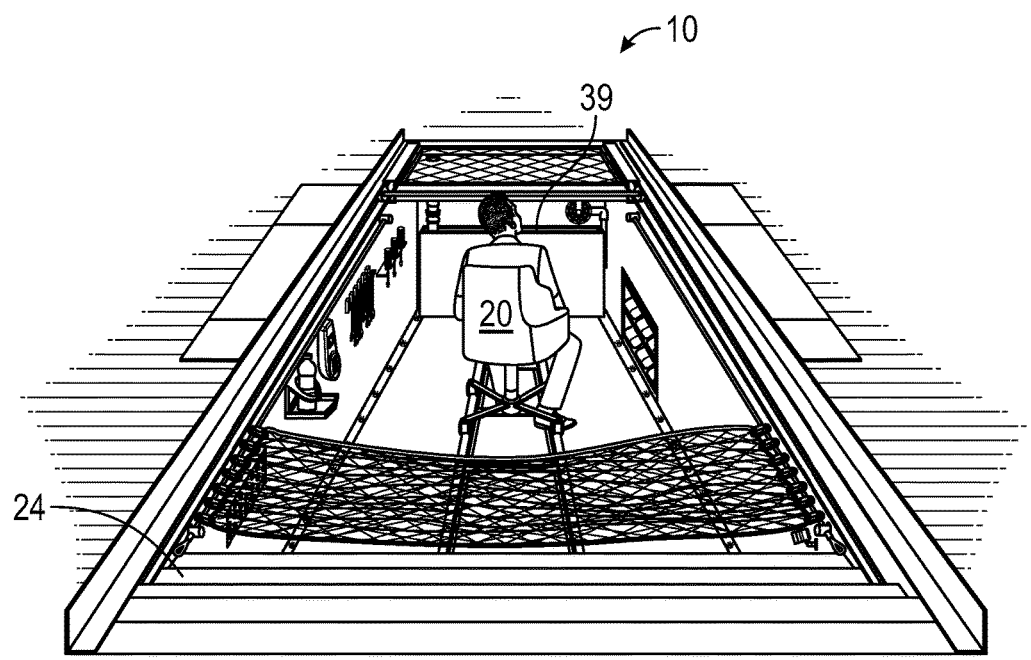
FIG. 4 is a perspective view of an embodiment of the vehicle service system of the present invention.

In the following description, specific details regarding embodiments of the present invention are described by reference to the figures in order to provide an understanding of the embodiments of the invention. However, upon studying this application, it will be understood by one of ordinary skill in the art that the embodiments may be practiced without these specific details. Well known objects, procedures, or techniques may not be described in detail. Technical terms used in this description have the same meaning as commonly understood to one of ordinary skill in the art to which the subject matter belongs.

Referring to the figures, embodiments of vehicle service system 10 of the present invention comprise a pit 12 over which a vehicle resting on ground level can be positioned and from which a service person can access the underside of the vehicle. Pit 12 comprises a floor 14 recessed into the ground, a pair of side walls 16 opposite and substantially parallel to each other, and a pair of substantially parallel end walls 18 opposite and substantially parallel to each other. Preferably, side walls 16 are spaced from each other a distance less than the width of the vehicle as measured between corresponding wheels of the vehicle, and end walls 18 are spaced from each other a distance sufficient to allow access to a substantial length of the underside of the vehicle when the vehicle is positioned above the pit.

In a preferred embodiment, pit floor 14 is recessed into the ground no deeper than the height of a person in a sitting position in a chair on the pit's floor. This depth enables a service person working on the underside of a vehicle to comfortably and effortlessly have access to all of the necessary lower touch-points of the vehicle while in a sitting position on pit floor 14. Preferably, the length and width of the pit floor is such that the service person can access a substantial part of the underside of the majority of automotive vehicles, or at least that part of the underside that most often requires access for the services being performed. Accordingly, the preferred dimensions of the pit's side walls 16 would have the length of pit floor 14 and the dimensions of the pit's end walls 18 would have the width of pit floor 14. However, other embodiments of the pit's floor 14, side walls 16, and end walls 18 may have other dimensions as appropriate to service the type of vehicle to be serviced. For example, in some embodiments, the pit floor may actually be much wider and/or much longer than needed to access the underside of the vehicle.

In a preferred embodiment, pit floor 14, side walls 16, and end walls 18 are formed of and/or lined with a material capable of sealing the waste produced by the type of vehicle being serviced. Preferably, pit 12 is preformed, increasing the ease of installation and saving installation time. Floor 14, side walls 16, and end walls 18 are preferably formed or reinforced by a strong, sealed material such as concrete block, concrete alone, concrete in plastic form, steel, or aluminum concrete, and lined with a material capable of sealing petroleum products and other vehicle waste products such as aluminum Tread Brite. In this way, pit 12 is fully sealed and environmentally friendly because anything spilled inside pit will not leach into the ground. Other embodiments of pit 12 may be formed of other materials or any combination of materials known in the art to support a structure within the ground below a vehicle and capable of sealing vehicle waste. Other embodiments of pit 12 may be formed of the sealing material, or may be formed of a non-sealing material and lined with a sealing material, or may be both formed and lined with a sealing material. Floor 14 is preferably lined with a non-skid material or combination of non-skid materials that covers in whole or in part pit floor 14 to aid in the prevention of accidental slip and fall injuries from the liquids that drip to pit floor and pit staircase during vehicle servicing.

Figure 5:
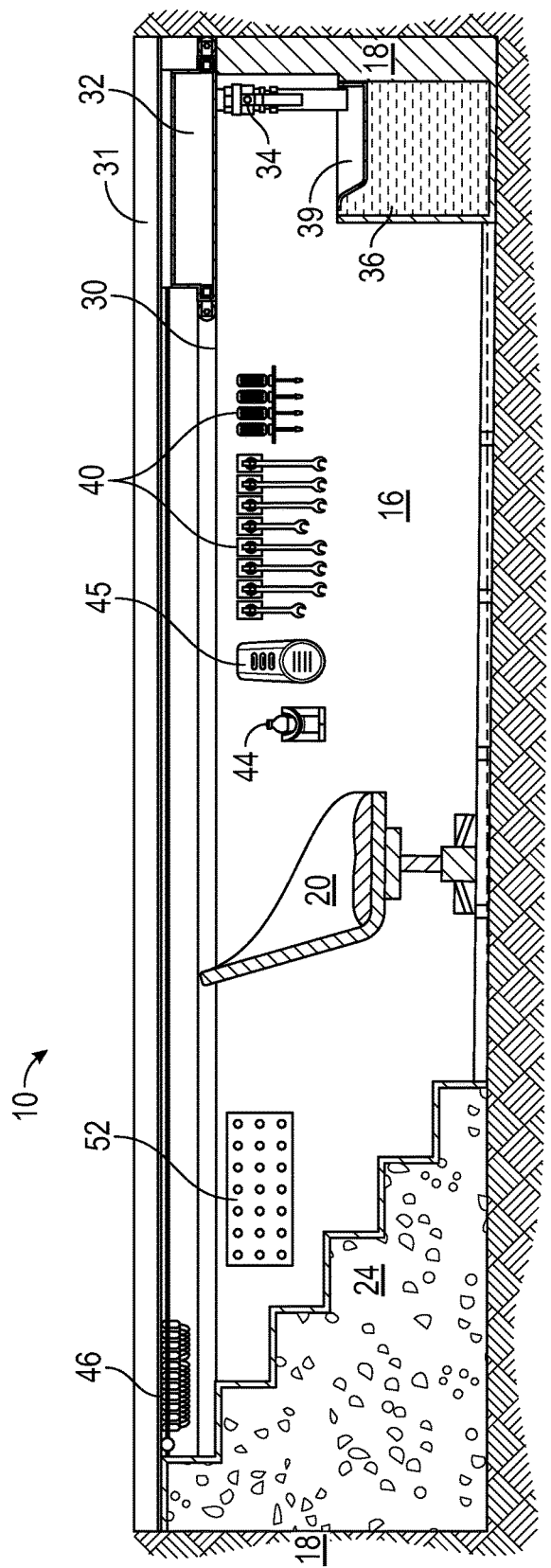
FIG. 5 is a cross-sectional side view of an embodiment of the vehicle service system of the present invention.

In a preferred embodiment, pit floor 14 has a slight slope from one end wall 18 to the other end wall (as illustrated in FIG. 5.) allowing liquids present on the pit floor to naturally flow toward a low point, collect there, and be removed from pit 12. Preferably, the low point where the liquids collect is under waste oil tank 36 and a grate covers the low point to support waste oil tank 36. The liquid is preferably removed by a pump system comprising a drain near the low point in the pit floor 14 and piping within the floor 14 connected to a tank outside pit 12. In some embodiments, the liquids may be removed by removing the grating covering the low point and using a vacuum to remove the liquids from pit 12. In some embodiments, tank 36 is capable of collecting the fluid collecting at the low point in the sloped floor 14. In other embodiments, pit floor 14 is substantially flat.

Embodiments of vehicle service system 10 of the present invention comprise a chair 20 mounted to tracks 22 that supports a person in a sitting position on pit floor 14. In a preferred embodiment, chair 20 is able to rotate 360 degrees, is height-adjustable, and is mounted onto tracks 22 allowing chair 20 to move along the length of the pit floor. In this way, a service person can service the vehicle from a sitting position, sliding effortlessly along the length of the pit, making it easy for the technician to move about freely and quickly, stay rested, and provide efficient service. Preferably, the chair is padded with a material resistant to waste produced by automotive vehicles. In other embodiments, the chair may rotate less than 360 degrees, may be formed of any material, and may or may not be padded. In some embodiments, more than one chair is used.

Embodiments of vehicle service system 10 of the present invention comprise a staircase 24. In a preferred embodiment, staircase 24 is preferably positioned on an end wall allowing a person to enter into the pit from the ground floor on which the vehicle rests. Preferably, staircase 24 is covered with non-skid material, or a combination of non-skid materials, in whole or in part, for safety. In other embodiments of the present invention, staircase 24 may be positioned on the other end wall or on any of the side walls 16 of pit 12, or positioned in pit 12 without being attached to a wall, and may be of any shape, including spiral staircases.

Embodiments of vehicle service system 10 of the present invention comprise at least one emergency egress shaft 26 in one of the pit's walls. In a preferred embodiment, emergency egress shaft 26 comprises a space within a side wall 16 through which a service person can pass to access a ladder 28 that leads to the ground floor on which the vehicle rests outside of the underside of the vehicle. Preferably, the top of emergency egress shaft 26 is covered by a grate that prevents persons on the ground floor of the vehicle from falling within the shaft but which is easily removable by a service person from within the shaft. In other embodiments, emergency egress shaft 26 may be in any other wall or any combination of walls, may comprise other escape mechanisms such as a stair case or may form a passage to another pit or vehicle service system.

Embodiments of vehicle service system 10 of the present invention comprise a rail 30 extending along the length of side walls 16 near or at the ground level of the vehicle. In a preferred embodiment, rail 30 comprises guides 31 that guide the wheels of the vehicle such that the vehicle straddles pit 12. In other embodiments, guides 31 need not be attached to the rail 30, but can be independent objects located on the ground level of the vehicle.

Embodiments of vehicle service system 10 of the present invention comprise a liquid waste recovery pan 32 shaped and sized so as to catch and contain liquids falling into pit 12 from the underside of the vehicle being serviced. Preferably, pan 32 is attached to rail 30 such that it can move along the length of the railing 30. In a preferred embodiment, liquid waste recovery pan 32 comprises a rectangular pan extending substantially across the width of pit 12 with wheels on the sides of the pan that coordinate with rivets within railing 30 to allow pan 32 to be moved along the length of rails 30. In this way, the service person may slide pan 32 smoothly to capture liquids falling/drained from the underside of the vehicle. In some embodiments, pan 32 may move by other means, including but not limited to a system of rivets and holes, cogs, etc. Preferably, pan 32 comprises a grating extending across its entire top that prevents solid objects from falling into it.

Preferably, pan 32 is sized to fit within the walls of pit 12 but also able to contain liquid waste oil from about six or seven automotive vehicles before needing to be dumped, decreasing the frequency with which the service person must dump waste contained within the pan. Preferably, pan 32 comprises a drain valve 34 located in a corner of the pan that allows the liquid waste contained within the pan to be drained into tank 36 by the service person's operation. Some embodiments of pan 32 include drain valves that automatically drain the pan as soon as it is in contact with a receiving valve end of tank 36. To accommodate vehicles that may produce a volume of liquid waste greater than the volume of pan 32, some embodiments of pan 32 include a hose attached permanently or removeably to drain valve 34 allowing the liquid waste collected by the pan to be drained directly into tank 36 wherever pan 32 has been moved.

Embodiments of vehicle service system 10 of the present invention comprise tank 36 in which the waste collected by liquid waste recovery pan 32 is dumped. In a preferred embodiment, tank 36 is shaped and sized to fit along the end wall 18 opposite stair case 24 and to fit within the distance between side walls 16. Preferably, the top of tank 36 is accessible to the service person while in a sitting position in chair 20. In other embodiments, tank 36 may be located within or along any wall of pit 12 or may be independent of the pit and/or may be of any shape or size. Preferably, tank 36 is formed of a material capable of containing waste products from a vehicle and is sized to hold all of the waste oil generated in a day from a pit service bay.

Tank 36 preferably comprises two tubs 39 recessed into the top of the tank, one tub for lubricating new oil filters, and a separate tub for placing and draining waste oil filters. Preferably the waste oil filter tub 39 comprises a tub recessed into the top of tank 36 and shaped to accommodate at least one oil filter and shaped to allow the filter to drain into the tank, preferably though holes in the bottom of the tub. Preferably, tank 36 further comprises an oil filter lubricator tub 39 comprising a tub recessed into the top of tank 36 and shaped to accommodate a sponge over which a new oil filter can be placed to become lubricated by absorbing fresh oil on the sponge. This allows a service person to pre-lubricate the new oil filter without significant mess and gives a clean filter that is lubricated with clean oil. Tubs 39 provide a system of managing the traditionally time-consuming and messy processes of collecting the waste oil, collecting waste oil filters, and lubricating new oil filters in a stream-lined process within an arm's reach of the service person sitting in chair 20. In other embodiments, the waste oil filter tub and oil filter lubricator tub may be one tub, and the tub or tubs need not be recessed into the top of the tank 36, but may attached to it in other ways, such as placed on top of tank 36 without being recessed, or placed in a side of the tank, or as an object/s independent of the tank connected to the tank by a tube.

Embodiments of vehicle service system 10 of the present invention comprise a waste oil pump system 38. In a preferred embodiment, waste oil collected in tank 36 is pumped to a location outside of the tank and pit 12 by a pump machine and tube or pipe system, allowing the service person to service vehicles all day without having to remove the waste oil stored in the tank. In some embodiments, tank 36 comprises a float valve system to trigger waste oil pump system 38. Preferably, pump system comprises a pump 38 that pumps liquid waste from tank 36 to an external tank through tubes placed within a wall near tank 36 and connected to the tank. However, in some embodiments, the pumps and associated pipes or tubes may be located anywhere within pit 12 and/or built within the walls the pit.

Embodiments of vehicle service system 10 of the present invention comprise storage space capable of being accessed while the service person is sitting in chair 20. In a preferred embodiment, storage space comprises a tool box 40 mounted on a side wall 16, filter storage compartment 42 built within a side wall 16, beverage holder 44 mounted on a side wall 16, and hand sanitizer dispenser 45 mounted on a side wall 16. This ensures that the tools, service parts, and the service person's refreshments are accessible from the sitting position of chair 20 but out of the way of the service person's space of movement in the chair, providing a clutter-free and organized work environment. Preferably, filter storage compartment 42 comprises racks angled to allow a filter to slide into place as a first filter is removed and the rack is recessed entirely within a side wall 16 so that it is out of the service person's way. In some embodiments, the storage space may be capable of storing any object or any number of objects, in any combination or coordination, and may be mounted on or built within any wall or floor of pit 12. For example, in some embodiments of the present invention, vehicle service system 10 comprises vented storage comprising an air pump that pumps fumes produced by objects such as oil rags out of the storage compartment and out of pit 12 through vents located within the pit's walls and/or floor.

Embodiments of vehicle service system 10 of the present invention comprise a low-lift system 29 capable of lifting a vehicle above pit 12 to allow services like tire rotation that require the wheels to be lifted off the ground floor of the vehicle. Preferably, the low-lift system 29 is located in a depression on the ground floor under where the tires of the vehicle would be present on both side of pit 12 on which the vehicle sits and is capable of lifting a vehicle above pit 12 with just enough space to allow a tire rotation. In some embodiments, low-lift system 29 is capable of lifting a vehicle to a height that allows the service person to stand in pit 12.

Embodiments of vehicle service system 10 of the present invention comprise a safety cover 46 extending across a substantial portion of pit 12 capable of preventing falls of persons or objects into the pit. In a preferred embodiment, safety cover 46 extends across a substantial portion of the length and width of pit 12, attached to rails 30 by hooks or carabiners such that the netting can be adjusted along the length of pit 12 as needed. Preferably, the safety net is of a petroleum-resistant synthetic web with a tensile strength capable of supporting the weight of an automotive vehicle. In other embodiments, safety cover 46 may be formed of other material capable of supporting objects of any weight over the pit. Other embodiments comprise more than one safety cover, for example, two safety covers, each on opposite sides of liquid waste recovery pan 32. In this way, as the service person moves liquid waste recovery pan 32, the service person can also alter the safety covers such that they extend over pit 12 where liquid waste recovery pan 32 does not extend. In some embodiments, safety cover 46 may be attached to objects other than railing 30, including rails independent of railing 30, safety net support cables or other support structures.

Embodiments of vehicle service system 10 of the present invention comprise a technician safety platform that supports a service person working on ground level (not on floor 14 of pit 12) to have closer access to the vehicle if the distance between the vehicle and ground level service person is such that pit 12 creates a gap between them. The safety platform preferably spans the width of pit 12 and is supported over the pit by side walls 16. In some embodiments the support structure attaches to rails 30 or guides 31 or attaches to only one of the pit walls 16 or 18. In some embodiments, the side of the safety platform on which the service person stands comprises a non-skid material.

Embodiments of vehicle service system 10 of the present invention comprise lighting 48. Preferably, energy-saving LED lighting is placed to provide ambient light without blinding the service person, for example, by embedding the lights on the underside of railing 30. In some embodiments, lighting is placed in any location in pit 12, including side walls 16 and stair case 24. Some embodiments may comprise any type of lighting, including incandescent or fluorescent light bulbs. Preferably, electrical wiring for the lighting and any other electrical devices in the pit 12 will be placed within the walls, floor, and/or staircase of the pit.

Embodiments of vehicle service system 10 of the present invention comprise an air conditioning and heating system. This prevents the temperature extremes associated with vehicle servicing and decreases service person weariness and discomfort. In a preferred embodiment, an air conditioner and heater is located outside pit 12 and passes cooled or heated air into pit 12 through vents within the pit's walls and/or floor. In some embodiments, the air conditioner and heater may be located within pit 12 or its walls without the need for vents.

Embodiments of vehicle service system 10 of the present invention comprise communication systems. In a preferred embodiment, video camera 50 is mounted on a wall of pit 12 and is capable of capturing activity within the pit for others outside the pit to view remotely. By allowing customers to view the vehicle servicing activity below the vehicle, customer trust is fostered. Preferably, a transmitting and receiving component 52 of an intercom system is mounted on a side wall 16 to allow the service person to communicate with other persons outside pit 12 without the need of shouting or moving out of the sitting position in chair 20. This fosters communication between service persons, service managers, or any other personnel present around the intercom system. In other embodiments, a transmitting and receiving component 52 for an intercom system may be located anywhere in pit 12 and any number of components may be present.

EXAMPLES

The invention is further described by the following non-limiting examples.

Example 1

A vehicle service system for automobiles was made by manufacturing a plastic form of a pit with two end walls, two side walls, and a floor. The plastic form pit was shipped to a customer for the customer's contractor to pour cement into the pit form. This formed walls eight-inches thick. The pit was recessed four feet into the ground with a length of twenty-one feet (the length of the side walls), and a width of forty inches (length of end walls).

A stair case was constructed at the rear end of the pit to allow a person to walk from the ground level into the pit, the stair case extending into the pit about four feet. At the bottom of the stair case (about four feet from the rear end wall to which the stairs is attached) an emergency egress shaft was constructed having a two foot wide opening within the right side wall (the side wall being on the right as a person walks down the stair case) that led to shaft two feet wide and four feet-six inches long. The shaft was open to the ground floor at its top but had a removable steel bar grating over the opening and a steel ladder that allowed one to climb up out of the opening by pushing the grating up.

The pit walls, floor, and stairs was lined with aluminum Tread Brite. Parts of the stairs and floor over which a service person could walk were further lined with a rubber matting to prevent slipping. Two tracks were installed on the pit floor adapted for use with a swivel chair so that the chair can slide the length of the pit from about the bottom of the stair case to the other end of the pit.

A railing system was placed on the top ends of the side walls. The rail system was adapted to coordinate with the wheels of a liquid waste recovery pan so that the pan can move along the length of the pit. The liquid waste recovery pan was a pan covered by a grating. The pan had a drain in one corner with a valve that coordinated with a receiving tub in a fifty-gallon waste oil tank at the end of the pit opposite the stairs. The receiving tub had holes in its bottom that allowed liquid to drain into the tank from the tub. A pump mounted on the end wall near the tank pumped liquid in the tank through pipes located within the pit walls, out of the pit, and into a larger storage tank outside of the pit. The pump was triggered by a float valve within the tank.

A storage compartment specialized for holding and dispensing new oil filters was built of several racks angled such that the oil filters would roll down the rack as the first oil filters were taken out of the rack. The oil filter storage rack system was built into the right side wall of the pit near the end of the pit where the tank was located so that the service person could easily transfer new oil filters from the rack into the tub of the tank to lubricate the oil filters. The rack was recessed about two feet into the side wall and into a cavity behind the side wall. Several other storage compartments were placed on the side wall opposite the wall in which the oil filter storage racks and emergency egress shaft were. Directly opposite the oil filter storage rack a storage space for used oil rags was recessed two feet into the side wall and into a cavity behind the side wall. The rag storage compartment had a vent to allow air to be suctioned out by a pump sitting outside the pit to remove the fumes produced by any oily rags. Other storage compartments and accessories were mounted on the same side wall as the rag storage compartment, including tool boxes, a beverage holder, a hand sanitizer dispenser, and a receiving and transmitting component of an intercom system.

A railing for a safety net was installed on the side walls of the pit just below the railing for the liquid waste recovery pan. The safety net was attached to this safety net railing by carabiners such that the net could be moved along the length of the pit as needed.

LED lighting was installed along the vertical parts of the stair case to illuminate the staircase, and installed along the top of the side walls just below the safety net railing to illuminate the pit. Vents for heated and cooled air to pass into the pit were placed between the waste oil tank and the storage space for used oil rags.

Example 2

An oil change was performed in which a vehicle was placed above the pit such that it straddled the pit. A service person entered the pit by the stairs, sat in the chair, glided the chair along the tracks, grabbed the appropriate tools from the tool box mounted on the side wall, removed the used oil filter from the vehicle, moved the liquid waste recovery pan along the railing to the appropriate location under the oil plug of the vehicle, drained the vehicle's used oil into the liquid waste recovery pan, placed the used oil filter in the tub in the waste oil tank to allow it to drain, chose the appropriate new oil filter from the oil filter rack, lubricated the new oil filter in the tub of the waste oil tank, and installed the new oil filter in the vehicle. While the service person performed the service functions, the person was able to place a beverage in the beverage holder, sanitize his or her hands using the sanitizer dispenser, and communicate with the other service people through the intercom system. After servicing about seven vehicles in this manner, the liquid waste recovery pan was drained into the waste oil tank by moving the pan over the tank such that the pan's valve was directed over the tub of the tank and opening the valve. At the end of the day, the liquid in the waste oil tank was pumped into a tank outside the pit for proper disposal.

Note that in the specification and claims, "about" or "approximately" means within twenty percent (20%) of the numerical amount cited. Although the invention has been described in detail with particular reference to these embodiments, other embodiments can achieve the same results. Variations and modifications of the present invention will be obvious to those skilled in the art and it is intended to cover all such modifications and equivalents.

What is claimed is:

1. A vehicle service apparatus allowing access to the underside of a vehicle placed over the apparatus, the apparatus comprising:
    a pit comprising a pit floor, an opposed pair of substantially parallel vertical first and second side walls, and an opposed pair of substantially parallel vertical first and second end walls, and wherein said pit floor is sloped downwards from said first end wall to said second end wall;
    a floor drain located in said pit floor near said second end wall;
    tracks attached to said pit floor along at least a portion of the length of said pit floor;
    a chair capable of supporting a person in sitting position on said pit floor between said side walls and said end walls, wherein said chair may attach to and glide along said tracks;
    a stair case near said first end wall;
    at least one opening within said first side wall near said first end wall sized to permit a person to exit said pit through said first side wall;
    at least one oil filter storage rack accessible through an opening within said first side wall near said second end wall, wherein said oil filter storage rack comprises at least one angled rack, and wherein said oil filter storage rack extends out of said pit;
    at least one oil rag storage compartment accessible through an opening within said second side wall near said second end wall;
    railing extending along at least a portion of the length of said side walls;
    a liquid waste recovery pan attached to said railing such that said liquid waste recovery pan can glide along said railing to capture liquids falling into said pit from the vehicle, wherein said liquid waste recovery pan comprises a drain valve located at the bottom of said pan near the side of said pan closest to said end wall;
    a tank contained entirely within said pit near said second end wall, said tank comprising at least one tub configured to be reached by a person sitting in said chair, said at least one tub shaped to accommodate at least one oil filter and to allow liquids within said at least one tub to drain into the tank and to receive liquids drained from said liquid waste recovery pan; and
    material lining said pit floor, side walls, and end walls capable of sealing petroleum products within said pit.

2. The vehicle service apparatus of claim 1 wherein said staircase is covered with non-skid material.

3. The vehicle service apparatus of claim 1 further comprising at least one pump capable of pumping liquid from said tank and from said floor drain.

4. The vehicle service apparatus of claim 1 wherein said railing comprises guides capable of guiding the wheels of a vehicle such that the vehicle is straddling said pit.

5. The vehicle service apparatus of claim 1 wherein said oil rag storage compartment is vented by means of an air pump.

6. The vehicle service apparatus of claim 1 further comprising a vehicle lift system.

7. The vehicle service system of claim 1 further comprising a safety cover extending across a substantial portion of the pit.

8. The vehicle service apparatus of claim 1 wherein said pit floor is covered with non-skid material.

9. The vehicle service apparatus of claim 1 further comprising communication systems.

10. A method of constructing a vehicle service apparatus allowing access to the underside of a vehicle placed over the apparatus, the apparatus comprising the steps of:
    forming a pit comprising a pit floor, an opposed pair of substantially parallel vertical first and second side walls, and an opposed pair of substantially parallel vertical first and second end walls, and wherein said pit floor is sloped downwards from said first end wall to said second end wall;
    placing a floor drain in said pit floor near said second end wall;
    attaching tracks to said pit floor along at least a portion of the length of said pit floor;
    placing a chair capable of supporting a person in sitting position on said pit floor between said side walls and said end walls, wherein said chair may attach to and glide along said tracks;
    placing a stair case near said first end wall;
    forming at least one opening within said first side wall near said first end wall sized to permit a person to exit said pit through said first side wall;
    placing at least one oil filter storage rack accessible through an opening within said first side wall near said second end wall, wherein said oil filter storage rack comprises at least one angled rack, and wherein said oil filter storage rack extends out of said pit;

placing at least one oil rag storage compartment accessible through an opening within said second side wall near said second end wall;
attaching railing along at least a portion of the length of said side walls;
attaching a liquid waste recovery pan to said railing such that said liquid waste recovery pan can glide along said railing to capture liquids falling into said pit from the vehicle, wherein said liquid waste recovery pan comprises a drain valve located at the bottom of said pan near the side of said pan closest to said end wall;
placing a tank contained entirely within said pit near said second end wall, said tank comprising at least one tub configured to be reached by a person sitting in said chair, said at least one tub shaped to accommodate at least one oil filter and to allow liquids within said at least one tub to drain into the tank and to receive liquids drained from said liquid waste recovery pan; and
lining said pit floor, side walls, and end walls with material capable of sealing petroleum products within said pit.

11. A method of servicing a vehicle comprising the steps of:
positioning a vehicle over a pit in the ground comprising a pit floor, an opposed pair of substantially parallel vertical first and second side walls, and an opposed pair of substantially parallel vertical first and second end walls, wherein said pit floor is sloped downwards from said first end wall to said second end wall toward a floor drain in said pit floor near said second end wall;
entering said pit using a stair case near said first end wall;
servicing the vehicle while sitting in a chair on said pit floor, wherein said chair glides along tracks attached to said pit floor along at least a portion of the length of said pit floor;
using a liquid waste recovery pan to capture liquids falling into said pit from the vehicle, wherein said liquid waste recovery pan is attached to railing extending along at least a portion of the length of said side walls such that said liquid waste recovery pan can glide along said railing, and wherein said liquid waste recovery pan comprises a drain valve located at the bottom of said pan near the side of said pan closest to said end wall; and
draining the liquid waste recovery pan using said drain valve into a tank contained entirely within said pit near said second end wall, said tank comprising at least one tub a configured to be reached by a person sitting in said chair, said at least one tub shaped to accommodate at least one oil filter and to allow liquids within said at least one tub to drain into the tank and to receive liquids drained from said liquid waste recovery pan.

* * * * *

UNITED STATES PATENT AND TRADEMARK OFFICE
CERTIFICATE OF CORRECTION

PATENT NO. : 10,053,884 B1
APPLICATION NO. : 15/272884
DATED : August 21, 2018
INVENTOR(S) : Albert Wayne Shinn Page 1 of 1

It is certified that error appears in the above-identified patent and that said Letters Patent is hereby corrected as shown below:

Column 12, Line 18, cancel the text beginning with "draining the liquid waste recovery pan" to and ending "said liquid waste recovery pan." in Column 12, Line 25, and insert the following language except for the deletion of a misplaced "a" after "tub" and before "configured" at Column 12, Line 21:

--draining the liquid waste recovery pan using said drain valve into a tank contained entirely within said pit near said second end wall, said tank comprising at least one tub configured to be reached by a person sitting in said chair, said at least one tub shaped to accommodate at least one oil filter and to allow liquids within said at least one tub to drain into the tank and to receive liquids drained from said liquid waste recovery pan.--

Signed and Sealed this
Ninth Day of October, 2018

Andrei Iancu
*Director of the United States Patent and Trademark Office*